ANECHOIC CHAMBER

Filed Dec. 16, 1965 2 Sheets-Sheet 1

INVENTORS
WILLIAM H. EMERSON
THOMAS F. PETERSON
BY James G. Lindsay
ATTY.

Dec. 27, 1966 W. H. EMERSON ETAL 3,295,133

ANECHOIC CHAMBER

Filed Dec. 16, 1965 2 Sheets-Sheet 2

INVENTORS
WILLIAM H. EMERSON
THOMAS F. PETERSON
BY James R. Lindsay
ATTY.

United States Patent Office 3,295,133
Patented Dec. 27, 1966

3,295,133
ANECHOIC CHAMBER

William H. Emerson, 7 High Ridge Road, Huntington, Conn. 06484, and Thomas F. Peterson, 14 Meadow Ridge Drive, Shelton, Conn. 06484

Filed Dec. 16, 1965, Ser. No. 514,334
5 Claims. (Cl. 343—18)

Figure 1:
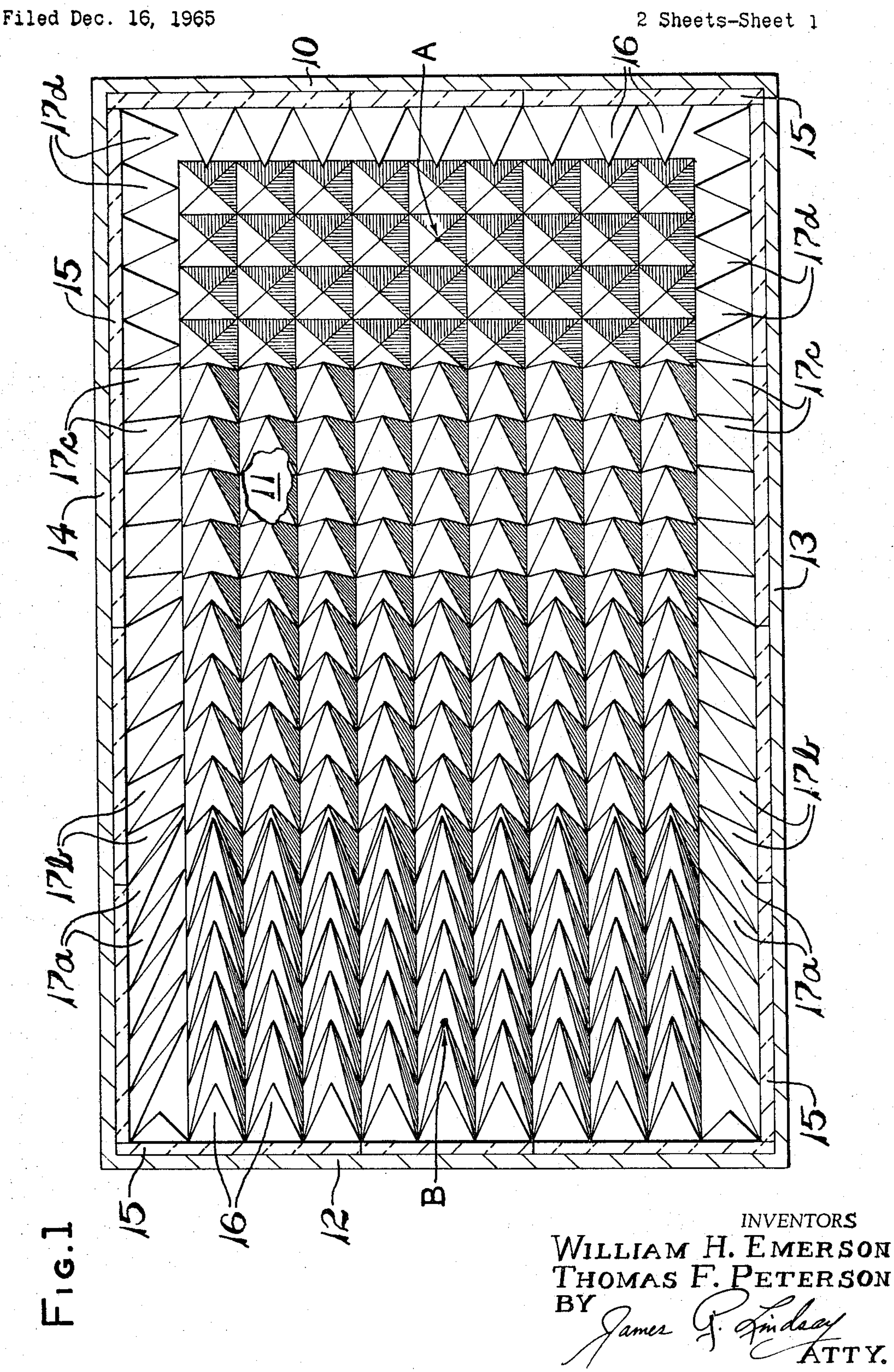

This invention relates to an anechoic chamber suitable for evaluating and measuring the characteristics of antennas and other electronic devices which ideally are studied in an environment which resembles that of outer space.

It is desirable when evaluating the characteristics of certain electronic devices that the studies be undertaken in an environment in which there are no interfering energy disturbances that would introduce inaccuracies into the test data. Such an environment is found in outer space. However, since it is not practical to conduct actual testing of such devices in outer space, such evaluations customarily are conducted in test chambers that are designed to provide an interior environment approaching the echo-free environment encountered in outer space. Various anechoic test chamber constructions have been proposed. They have met with varying degrees of success in approaching an essentially echo-free environment.

The interior of such test chambers are lined with microwave energy absorbing material intended to absorb microwave energy impinged against the walls, floor or ceiling of the chamber and thereby prevent the energy from being reflected back or re-emitted into the interior of the chamber. Two general types of microwave energy absorbing material are available for such purposes. One type of absorbing material used for lining the interiors of anechoic chambers is characterized as narrow band absorber material. This type of absorbing material is a relatively thin sheet or panel of low dielectric material that effectively absorbs only a rather limited frequency band of microwave energy. The other principal type of absorbing material commonly is referred to as broad band absorbing material and is effective over a much greater frequency range than the narrow band material. The broad band absorber material is considerably thicker than narrow band absorbers, usually having a thickness of at least ¼ of the length of the longest wave length to which the absorbing material is to be exposed when in use.

Broad band absorbing materials may be separated additionally into two distinct classes of absorbing materials depending upon the manner by which microwave energy impinged against it is absorbed. One such class of broad band absorbing material is similar to the narrow band absorber in that it is a flat panel. However, it differs from the narrow band absorbing material in that the microwave energy absorbing substance present in the broad band panel increases in proportion from the front face of the panel to the back face of the panel so that microwave energy entering the panel encounters an increasing concentration of the microwave energy absorbing material as it progresses through the thickness of the panel. The panel may consist, for example, of several layers of low dielectric constant material which have dispersed therein varying amounts of the microwave energy absorbing substance, the amount of energy absorbing material included in each successive layer being proportionally greater as the layers recede from the front to the rear of the panel.

The other class of broad band absorber depends to a great extent upon the geometrical configuration of the absorber structure for obtaining acceptable absorption of the microwave energy. It is to this class of broad band absorber that the present invention relates. Heretofore, this class of absorber has been comprised of pyramidal-shaped or cone-shaped elements whose axes are perpendicular to the base of the absorber panel of which they are a part, in the manner illustrated in U.S. Patent 2,464,006. When the absorber material is applied to the interior surfaces of the chamber, the pyramidal-shaped or cone-shaped elements project directly into the interior of the chamber.

The electronic component to be evaluated in an anechoic chamber is placed at one end of the chamber facing toward a position at the opposite end of the chamber from which a microwave energy signal can be beamed toward the device under evaluation. Although the signal is beamed directly at the device being observed, it will be appreciated that as the signal leaves the source of energy illumination the energy waves tend to diverge to form a signal of constantly expanding cross-section. The microwave energy absorbing material which lines the side walls, floor and ceiling of the chamber is intended to absorb microwave energy which "strays" too far from the axis of the signal beam and impinges against these surfaces of the chamber. Ideally, all microwave energy impinged against the absorber material is absorbed so that no wave energy is reflected back into the interior of the chamber to cause interference with the signal beam and inaccuracies in the test data. Unfortunately, the test chambers which heretofore have been built are not completely effective.

It now has been found that the performance of an anechoic chamber can be improved if the axes of the pyramidal-shaped or conical-shaped elements of the absorber material lining the side walls, floor and ceiling are canted toward the illuminating end of the chamber from which the signal beam is transmitted rather than projecting directly into the chamber or canted toward the rear of the chamber in which the device being evaluated is positioned. Ideally, the axis of each pyramidal-shaped or cone-shaped element points directly at the source of signal illumination.

Figure 2:
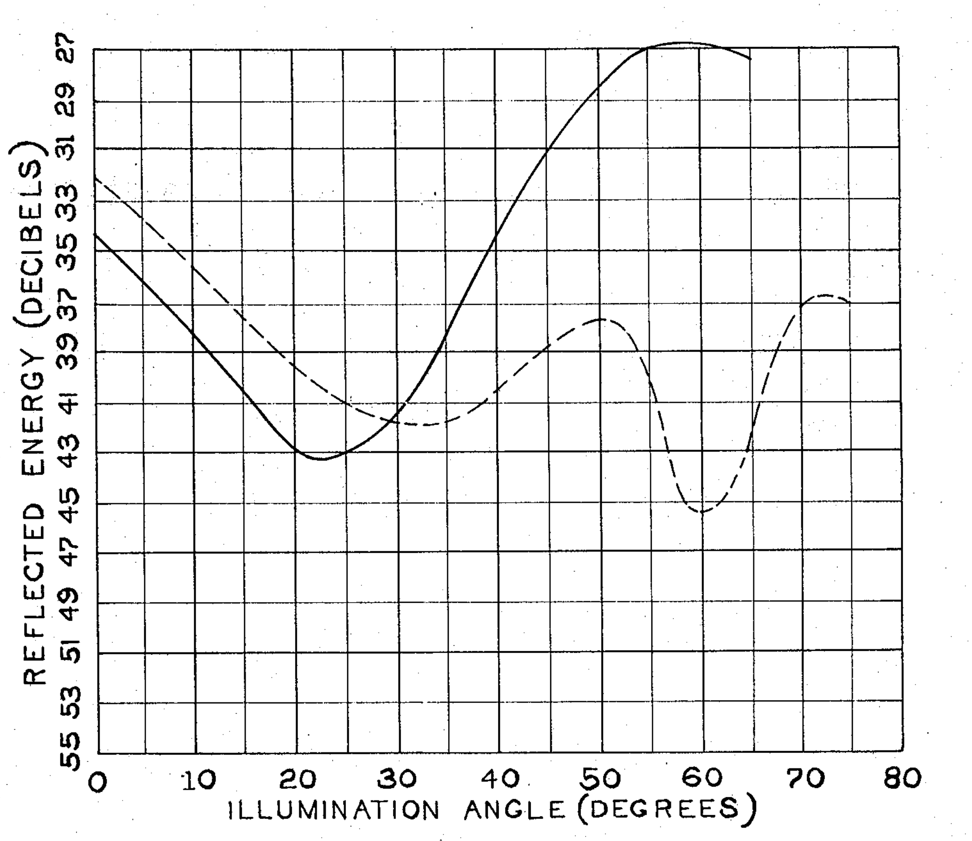

The invention will be more clearly understood from the following description of a specific embodiment of the invention and from the drawings in which:

FIG. 1 is a side elevation view in section of an anechoic chamber embodying this invention; and FIG. 2 is a graph showing the variance in reflected microwave energy experienced with absorber material having pyramidal-shaped elements whose axes are canted toward the source of illumination as compared to absorber material having pyramidal-shaped elements whose axes are perpendicular to the base of the absorber material.

Referring to the embodiment of the invention illustrated in FIG. 1 of the drawings, the anechoic chamber is a rectangular-shaped room defined by a front wall 10, side walls 11 (only one side wall being shown), back wall 12, floor 13 and ceiling 14. The walls, floor and ceiling of the chamber are formed of any conventional structural material, the specific structural material selected for use in the chamber walls, floor and ceiling not being a part of the present invention. The size of the chamber will vary depending upon the types of devices to be evaluated, commercial chambers having a length of only a few feet having been employed in certain instances while chambers exceeding 100 feet in length have been used in other instances. The interior surfaces of the front, back and side walls 10, 11 and 12 and of the floor 13 and ceiling 14 of the chamber are lined with microwave energy absorbing material 15 which is intended to absorb microwave energy which impinges against it. In the embodiment shown, the back and front walls 10 and 12 are lined with an absorbing material which is comprised of pyramidal-shaped elements 16, 16 whose axes are perpendicular to the base of the absorbing material which base abuts against the structural surface of the wall whereby the elements 16, 16 project perpendicularly into the chamber. The side walls 11 and floor 13 and ceiling 14 are lined with an absorbing material which comprises pyramidal-shaped elements whose axes are canted toward the front of the chamber from which the test signal is beamed (for example, from point A) toward the device being evaluated, which device is located normally in the rear portion of the chamber (for example, at point B). In the embodiment shown in FIG. 1, the longitudinally extending surfaces of the chamber (consisting of the two side walls, the floor and the ceiling) each is provided with zones of pyramidal-shaped elements of different cant. As illustrated, the pyramidal-shaped elements 17*a*, 17*a* adjacent the back wall 12 of the chamber are canted toward the front of the chamber a greater degree with respect to the wall surface than elements 17*b*, 17*b*, and elements 17*b*, 17*b* are canted toward the front of the chamber a greater degree with respect to the wall surface than elements 17*c*, 17*c*. Elements 17*d*, 17*d* which are laterally adjacent the point of signal illumination A and adjacent the front wall 10 are not canted at all but project, instead, perpendicularly into the chamber. As indicated above, ideally the axis of each inwardly projecting absorber element located on the side walls, floor and ceiling of the chamber would point directly at the source of signal illumination A for optimum performance. However, since such a construction would be extremely expensive to construct for commercial installations, zones of different degree of cant such as is illustrated in FIG. 1 normally are employed. For some purposes, only those projecting absorber elements of the longitudinal surfaces laterally adjacent the device to be evaluated are provided with elements which are canted toward the front of the chamber.

A flat panel-type broad band absorbing material often is used on the floor surface of the chamber to form pathways on which one can walk and in areas where protruding pyramids or cones of the geometrical-type broad band absorbing material would be impractical or unsuitable because of space limitations. However, since the geometrical-type broad band absorbing material is considered to be most effective, it normally is used to line the chamber's interior wherever possible and practical.

The graph of FIG. 2 illustrates the improvement in performance which can be realized through the use of pyramidal-shaped or conical-shaped absorber elements canted toward the source of signal illumination. The data upon which the graph is based was derived by measuring the energy reflected from a wall lined with absorber material when microwave energy is impinged against the absorber material at varying angles to the plane of the wall. An illumination angle of 0° represents impingement of microwave energy along a path normal to the plane of the wall whereas an illumination angle of 90° represents a signal traveling along a path that is parallel to the plane of the wall. An illumination angle of 60° is achieved when the signal impinged against the lined wall is at an angle of 60° with a normal to the wall (or expressed in other words, forms an angle of 30° with the plane of the wall). Measurements were obtained with the wall surface lined with pyramidal-shaped elements whose axes were normal to the plane of the wall (the plot depicted by the dash line on the graph representing the results observed), and were obtained with the wall surface lined with pyramidal-shaped elements whose axes were canted in the same direction so as to form an angle of 30° with the plane of the wall (the plot depicted by the solid line on the graph representing the results observed). The graph illustrates that as the illumination angle is increased beyond 30°, the canted elements more effectively absorb the microwave energy impinged against it than do those elements whose axes are normal to the plane of the wall and that when the axes of the canted elements point directly at the source of the signal optimum efficiency is achieved.

In utilizing the anechoic chamber, the device to be evaluated is mounted, usually on a pedestal, centrally between the side walls of the chamber and in the rear of the chamber and is positioned to receive a microwave energy signal that is beamed in its direction from a signal-emitting device located either in the front part of the chamber or located exteriorly of the chamber but positioned to direct the signal through a port or window positioned in the front wall of the chamber.

While the apexed protrudances of the absorber material have been referred to as pyramidal-shaped or cone-shaped elements, it will be understood that the absorber material may have elements of any geometrical shape that has side surfaces that slope toward an apex as they extend inwardly into the anechoic chamber.

We claim:

1. An anechoic chamber for providing an environment simulating that of outer space in which electronic devices can be evaluated, said chamber comprising a back wall toward which microwave energy is directed during the evaluation of electronic devices in said chamber, a front wall and longitudinally extending surfaces formed by side walls, a floor and a ceiling which extend between said front wall and said back wall and in conjunction with said front and back walls form said chamber, said chamber being lined with microwave energy absorbing material for absorbing microwave energy impinged thereagainst, said absorbing material lining said longitudinally extending surfaces of said chamber comprising elements projecting into the interior of said chamber that have side surfaces that slope toward an apex as they extend into said chamber and that have axes which are canted toward the front portion of the chamber.

2. The anechoic chamber of claim 1 in which the absorbing material on those portions of the said longitudinally extending surfaces of the chamber that are adjacent the back wall of the chamber have elements projecting into the interior of the chamber that have side surfaces that slope toward an apex as they extend into said chamber and that have axes which are canted toward the forward portion of the chamber.

3. The anechoic chamber of claim 2 in which the absorbing material on those portions of the said longitudinally extending surfaces of the chamber that are adjacent the front wall of the chamber have elements projecting into the interior of the chamber that have side surfaces that slope toward an apex as they extend into said chamber and that have axes which are normal to the surface over which they are disposed.

4. Microwave energy absorbing material for absorbing microwave energy impinged thereagainst, said absorbing material comprising elements protruding from one surface of the absorbing material which elements have side surfaces that slope toward an apex as they extend away from the base of the absorbing material and which elements have axes which are canted to the base plane of the absorber material.

5. The microwave energy absorbing material of claim 1 in which the protruding elements are pyramidal in shape.

No references cited.

CHESTER L. JUSTUS, *Primary Examiner.*

D. C. KAUFMAN, *Assistant Examiner.*